Feb. 17, 1931. C. F. KELLOM 1,792,694
LUBRICATING DEVICE FOR BOLTS
Filed June 12, 1929
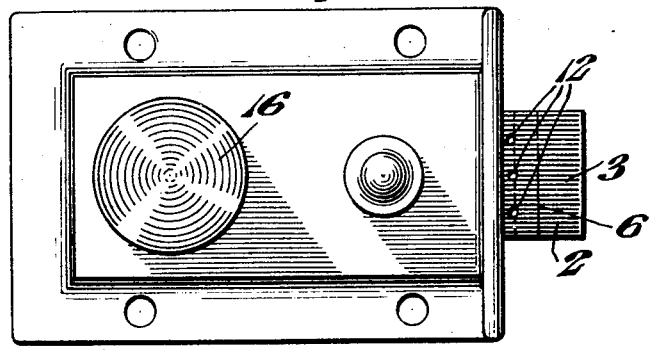
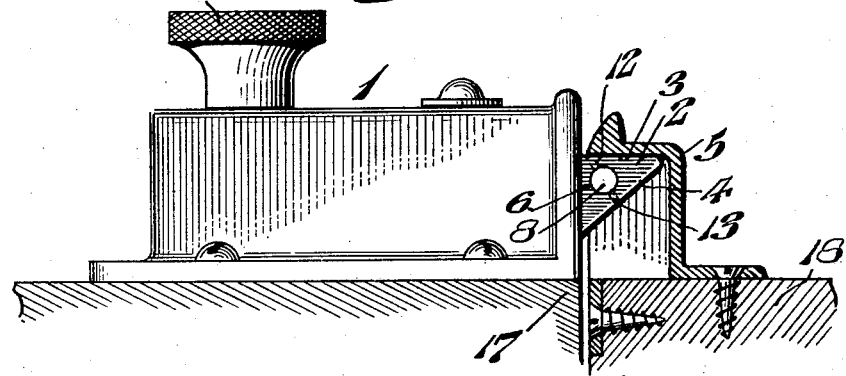
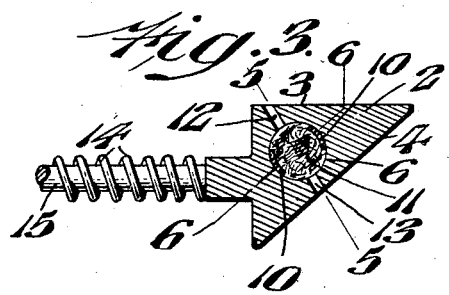
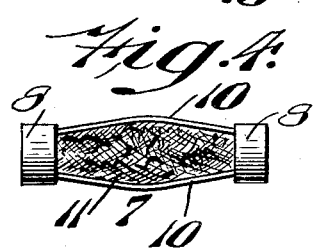
INVENTOR:
CHARLES F. KELLOM:
BY
ATTORNEYS.

Patented Feb. 17, 1931

1,792,694

UNITED STATES PATENT OFFICE

CHARLES F. KELLOM, OF PHILADELPHIA, PENNSYLVANIA

LUBRICATING DEVICE FOR BOLTS

Application filed June 12, 1929. Serial No. 370,177.

My invention relates to a novel construction of a lubricating device for the bolts of locks, latches, and the like, for locking a door of any character, or an automobile door or the like, wherein I bore the bolt member transversely to form a lubricant chamber and insert therein a suitable lubricating device, preferably composed of a wick saturated with a lubricant, which is frictionally retained within the bolt, said bolt having lubricating ports therein communicating with said lubricant chamber and so disposed as effectively to lubricate the bolt surfaces under all conditions and enable the door element carrying the bolt readily to lock when it is slammed towards the keeper or door jamb.

It further consists of a novel construction of a lubricant container, comprising annular closed heads, which are joined by resilient, bowed arms, within which the wick or the like saturated with lubricant is contained, said lubricating element and its container being retained within the bolt by the frictional contact between said bowed spring arms and the wall of the transverse chamber in the bolt, so that a constant supply of lubricant is at all times furnished to the desired surfaces, thereby making my novel device especially adaptable to the lubricating of bolts, locks, latches and the like, as for autobiles which are exposed to the elements.

It further consists of other novel features of construction and advantage, all as will be hereinafter described and claimed.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings:

Fig. 1, represents a front elevation of a latch or fastener, equipped with my novel bolt lubricating device.

Fig. 2, represents a top plan view of Fig. 1, the keeper and a portion of the door jamb being shown in section.

Fig. 3, represents a sectional view of the bolt element removed showing the manner of positioning and supporting the lubricating device therein.

Fig. 4, represents a side elevation of the lubricating device and its container composed of the annular heads, and the intermediate resilient bowed arms.

Fig. 5, represents a section on line 5—5, Fig. 3.

Fig. 6, represent a section on line 6—6, Fig. 3.

Similar numerals of reference indicate corresponding parts.

1 designates the body or casing of a conventional lock or fastener, the same being provided with the bolt element 2, which is of generally triangular shape, composed of the wall 3 and the bevelled or inclined wall 4, said bolt being adapted to snap into or engage the coacting keeper 5 of conventional type, as will be understood from Fig. 2. 6 designates a cylindrical passage or chamber extending transversely of the bolt 2, as will be understood from Figs. 2 and 3, said chamber being provided with the lubricant carrier 7, which is shown detached in Fig. 4 and comprises the terminal annular rings or heads 8, closed at their ends, as indicated at 9, which are joined by the bowed, resilient arms 10, preferably two in number, as will be understood from Fig. 4. Within the end heads or rings 8 which are shaped to form cups as seen in Fig. 5, and between the bowed resilient arms 10 is confined the wicking 11 which is saturated and with a suitable lubricant, so that when the container 7 and its contents are inserted in position in the bolt 2, as seen in Figs. 5 and 6, a constant supply of lubricant will be permitted to flow through the ports 12, and the opposite ports 13, so that the surfaces 3 and 4 will be kept lubricated at all times and the bolt member can readily be retracted against the tension of the spring 14 surrounding the stem 15 of the usual construction as seen in Fig. 3. When the lubricating wick 11 and its container 7 are withdrawn from the bolt, the parts appear as seen in Fig. 4, the resilient arms 10 being slightly bowed. When the container 7 and its lubricating wick 11 are assembled in position within the bolt 2, as seen in Figs. 3, 5, and 6, the frictional contact between the arms 10 and the wall of the chamber 6 causes the bowed arms 10 to be slightly compressed, as seen in Fig. 6, so that the wick and its container will be frictionally retained in the position seen in Figs. 3, 5, and 6 within the bolt at all times. The bolt 2 may be actuated or retracted manually in the usual manner by the knurled finger piece 16, and it is unnecessary to describe the construction thereof or its connection to the stem 15 to actuate the latter, as these elements, per se, form no part of my present invention. It is well known that locks of this general character, particularly on automobile doors and in other exposed situations, are subjected to inclement weather, and the bolts thereof soon become more or less corroded, and do not automatically lock, when the door is slammed shut, which objectionable condition is completely obviated by my invention, since the requisite supply of lubricant is at all times afforded to the exposed surfaces of the bolt.

When the supply of lubricant to the wick 11 has to be replenished, the container 7 can be readily pushed longitudinally from the bolt, and either the wick removed and saturated with fresh lubricant or the wick can remain in the container, and the latter be dipped in the fresh lubricant, as may be desired. The door element 17 and the door jamb or frame 18, seen in Fig. 2, are of any conventional character, the keeper being set in or secured to the door jamb, as is customary, and requiring no further description.

It will be apparent that by my invention a vehicle or other door can be readily shut without undue slamming, and the constant provision of the very slight film of oil on the juxtaposed surfaces of the bolt and keeper will tend to prevent rattling and automatically to compensate for any slight warping or distortion of the vehicle or door thereof, with respect to the door jamb.

The film of oil supplied to the coacting bolt and keeper surfaces is relatively very thin, so that the liability of injury to the clothing of the vehicle passengers is reduced to a minimum.

I am aware that the invention may be embodied in other specific forms without departing from the spirit or essential attributes thereof, and I therefore desire the present embodiment to be considered in all respects as illustrative and not restrictive, reference being had to the appended claim rather than to the foregoing description to indicate the scope of the invention.

Having thus described my invention, what I claim as new, and desire to secure by Letters Patent, is:

In a device of the character stated, a lubricant container, comprising a pair of terminal closed cup shaped heads, outwardly bowed resilient arms connecting said heads, and a lubricant carrier positioned within said heads and arms.

CHARLES F. KELLOM.